(12) United States Patent
Brown

(10) Patent No.: US 8,388,233 B2
(45) Date of Patent: Mar. 5, 2013

(54) AXIAL BEARING ARRANGEMENT AND METHOD FOR MANUFACTURING SAME

(75) Inventor: James Kevin Brown, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 308 days.

(21) Appl. No.: 12/840,767

(22) Filed: Jul. 21, 2010

(65) Prior Publication Data

US 2011/0019947 A1 Jan. 27, 2011

Related U.S. Application Data

(60) Provisional application No. 61/227,598, filed on Jul. 22, 2009.

(51) Int. Cl.
*F16C 33/46* (2006.01)
*B21D 53/12* (2006.01)
(52) U.S. Cl. ................... 384/623; 29/898.067; 384/621
(58) Field of Classification Search .......... 384/618–623; 29/898.061, 898.067
See application file for complete search history.

(56) References Cited

U.S. PATENT DOCUMENTS

| | | | | |
|---|---|---|---|---|
| 2,584,652 A | * | 2/1952 | Ablett | 384/608 |
| 3,433,543 A | * | 3/1969 | Eck | 384/621 |
| 4,413,866 A | * | 11/1983 | Geisey | 384/572 |
| 4,909,644 A | * | 3/1990 | Owens | 384/614 |
| 5,114,249 A | * | 5/1992 | Muntnich et al. | 384/622 |
| 5,630,670 A | * | 5/1997 | Griffin et al. | 384/606 |
| 5,879,086 A | * | 3/1999 | Muntnich et al. | 384/621 |
| 2006/0193549 A1 | * | 8/2006 | Fugel et al. | 384/620 |
| 2007/0248298 A1 | * | 10/2007 | Chihara | 384/579 |

FOREIGN PATENT DOCUMENTS

DE 198 57 033 6/1999

* cited by examiner

*Primary Examiner* — Thomas R Hannon
(74) *Attorney, Agent, or Firm* — Lucas & Mercanti, LLP; Klaus P. Stoffel

(57) ABSTRACT

The invention relates to a first bearing arrangement (1) and a method for the manufacture thereof, with a first bearing ring (3) forming a structural unit (16) with a radially inwardly directed axial projection (11) with a radially outwardly directed resilient element (13) and a first running surface (5), and a second bearing ring (2) with a radially outwardly arranged axial projection (10) with a radially inwardly directed resilient element (12), with a second running surface (4), and a single-piece rolling body cage (6) which receives distributed over the circumference rolling bodies (8) which roll on the running surfaces (4, 5), wherein the rolling body cage (6) radially engages over the two resilient elements (12, 13).

In order to be able to manufacture the axial bearing arrangement (1) without further post processing steps as a structural unit (16), the invention proposes to construct the rolling body cage (6) radially slotted, so that the cage can be radially elastically pulled over the resilient elements (12, 13) of the bearing rings (2, 3).

4 Claims, 1 Drawing Sheet

AXIAL BEARING ARRANGEMENT AND METHOD FOR MANUFACTURING SAME

This application claims the priority of U.S. 61/227,598 filed Jul. 22, 2009, which is incorporated by reference herein.

FIELD OF THE INVENTION

The invention relates to a axial bearing arrangement with a first bearing ring forming a structural unit with a radially inwardly arranged axial projection with a radially outwardly directed resilient element and a first running surface, and a second bearing ring with a radially outwardly arranged axial projection with a radially inwardly directed resilient element with a second running surface and a single-part rolling body cage which receives rolling bodies which roll distributed over the circumference on the running surfaces, wherein the cage encloses radially the two resilient elements.

BACKGROUND OF THE INVENTION

An axial bearing arrangement of this generic type is known from DE 198 57 033 A1, wherein the axial bearing arrangement which captively secures as a structural unit the bearing rings and the rolling body cage receiving the rolling bodies relative to each other. The bearing rings are constructed so as to be L-shaped in cross-section with a respectively radially outer and a radially inner axial projection, wherein, after the rolling body cage has been introduced, the ends of the radial projections are roller-burnished or beaded, so that radial resilient elements are formed, which axially fix the rolling body cage between the running surfaces for the rolling bodies arranged at the bearing rings and the resilient elements, and, thus, the bearing rings and the rolling body cage are held on each other while forming the structural unit of the axial bearing arrangement. For realizing the resilient elements, material-deforming manufacturing steps are required after positioning of the parts on each other, wherein the manufacturing steps are, especially in the manufacture of the bearings in manufacturing robots, foreign to the manufacture and thereby expensive and complicated.

OBJECT OF THE INVENTION

Therefore, this results in the object of proposing an axial bearing arrangement constructed as a structural unit and a method for manufacturing the axial bearing arrangement without any additional material-deforming manufacturing steps after positioning of the structural components of the axial bearing arrangement relative to each other.

DESCRIPTION OF THE INVENTION

The invention is solved by a axial bearing arrangement with a first bearing ring forming a first structural component with a radially inwardly arranged axial projection with a radially outwardly directed resilient element and a first running surface and a second bearing ring with a radially outer axial projection and a radially inwardly directed resilient element with a second running surface and a single-piece rolling body cage which receives rolling bodies which are distributed over the circumference and roll on the rolling surfaces, wherein the rolling body cage engages radially over the two resilient elements, wherein the rolling body cage is radially slotted. The radial slot, which may extend between two rolling bodies which are adjacent in circumferential direction, the rolling body cage is constructed so as to be radially elastic and can be expanded or narrowed beyond the diameter of the resilient elements and without any further manufacturing steps can be pulled over the resilient elements.

In accordance with an advantageous embodiment, the axial bearing arrangement may be equipped with rolling bodies formed of balls or preferably radially directed needles. The bearing rings have radially aligned and axially spaced apart running surfaces which are essentially parallel to the resilient elements, wherein the rolling body cage engages over the resilient elements provided at the bearing rings in the non-tensioned state and, thus, it is axially securely fixed between the resilient elements and the running surfaces. As a result, the rolling body cage also fixes the two bearing rings one on top of the other by being axially fixed radially outwardly on one running ring and radially inwardly fixed axially at the other bearing ring.

In accordance with an advantageous embodiment, the rolling body cage may be pre-tensioned radially outwardly and radially inwardly relative to the bearing rings and may center the bearing rings relative to each other. For this purpose, the rolling body cage may have a radially inwardly and radially outwardly, axially at least once folded, annular rim. This annular rim may have a radial elasticity and may be calibrated relative to its diameter. It has been found advantageous if the annular rim is folded twice in axial direction.

The object is additionally met by a method for manufacturing a axial bearing arrangement forming a structural unit including a first bearing ring with a radially inner axial projection with a radially outwardly directed resilient element and a first running surface, a second bearing ring with a radially outer axial projection with a radially inwardly directed resilient element with a second running surface as well as a single-piece rolling body cage which receives rolling bodies which are distributed over the circumference and roll on the rolling surfaces, wherein the rolling body cage radially engages over the two resilient elements, wherein the rolling body cage is radially slotted and is placed under radial pretension in the bearing ring under elastical tensioning of the rolling body cage over one of the resilient elements of a bearing ring, and the other bearing ring is pulled in the opposite direction over the rolling body cage by overcoming its resilient element under radial pretension of the rolling body cage.

BRIEF DESCRIPTION OF THE DRAWINGS

The invention is in the following explained in more detail with the aid of the embodiment illustrated in FIGS. 1 and 2. In the drawing.

DETAILED DESCRIPTION OF THE DRAWINGS

Figure 1:
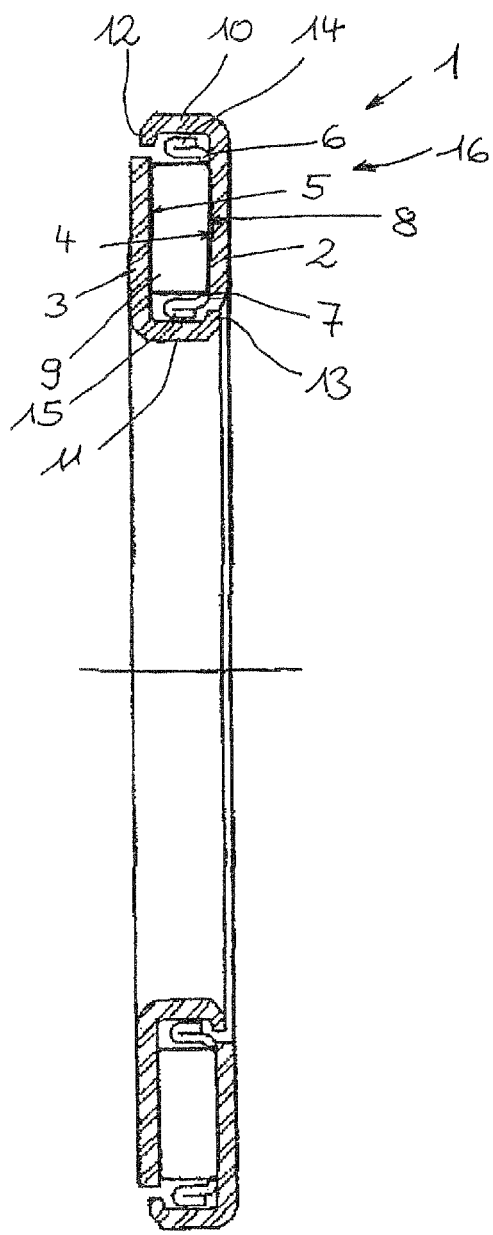
FIG. 1 is a longitudinal sectional view of a axial bearing arrangement according to the invention.

FIG. 1 shows a longitudinal sectional view of the axial bearing arrangement 1. The two bearing rings 2, 3 are made of shaped steel parts which have radially aligned running surfaces 4, 5 for the rolling bodies 8 in the form of radially aligned needles 9 which are distributed over the circumference of the rolling body cage 6, wherein the rolling bodies 8 are received spaced apart over the circumference in resilient elements 7 in rolling body cage 6. The bearing rings 2, 3 each have radially inwardly or radially outwardly arranged axial projections 10, 11 on which are already provided out-of-tool resilient elements 12, 13 directed radially inwardly as well as radially outwardly.

The rolling body cage 6 has at its inner circumference and at its outer circumference annular rim 14, 15 each which is folded over several times axially, wherein the rim engages radially over the resilient element 12, 13, so that the rolling body cage 6 is received secure against loss in the bearing rings 2, 3 and centers and secures the bearing rings against loss on each other. The outer and/or inner circumference of the annular rims 14, 15 may be radially tensioned relative to the axial projection 10 or 11.

The assembly of the axial bearing arrangement 1 into a captive structural unit 16 takes place without positioning the bearing rings 2, 3 and the rolling body cage 6 on each other by way of a radially elastic configuration of the rolling body cage 6. In this manner, the outer circumference of the rolling body cage 6 can be radially expanded for overcoming the resilient element 12 of the bearing ring 2 and can be captively received in the bearing ring 2 and the inner circumference for overcoming the resilient element 13 of the bearing ring 3 can be radially reduced and captively received in the bearing ring 3, so that a subsequent processing of the structural unit 16 becomes superfluous.

Figure 2:
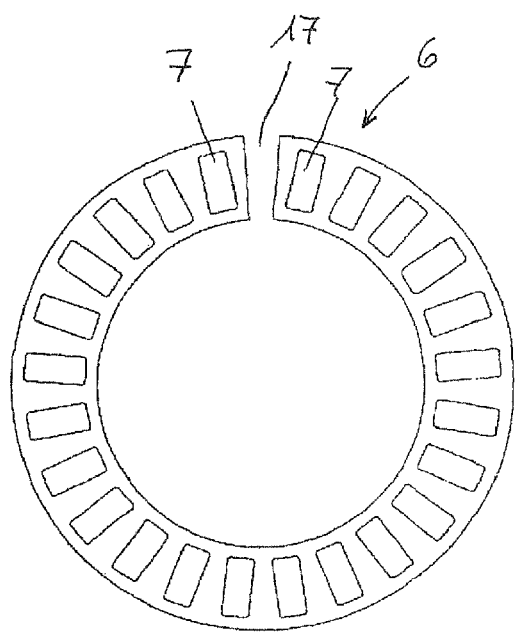
FIG. 2 is a view of the rolling body cage of FIG. 1.

As can be seen from FIG. 2, which shows the rolling body cage 6 of FIG. 1 in a view, the single-part rolling body cage 6 has a radially aligned slot 17 between two adjacent resilient elements 7 as seen in the circumferential direction. By way of the slot 17, the rolling body cage 6 can be pre-tensioned and radially expanded or radially narrowed and returns after the elastic narrowing of its outer circumference or the elastic expansion of its inner circumference, back into its original position and is thereby axially fixed between the resilient elements 12, 13 and the running surfaces 4, 5 of the bearing rings 2, 3 (FIG. 1).

REFERENCE NUMERALS

1 Axial bearing arrangement
2 Bearing ring
3 Bearing ring
4 Running surface
5 Running surface
6 Rolling body cage
7 Groove
8 Rolling body
9 Needle
10 Axial projection
11 Axial projection
12 Resilient element
13 Resilient element
14 Annular rim
15 Annular rim
16 Structural unit
17 Slot

The invention claimed is:

1. Axial bearing arrangement with a first bearing ring forming a structural unit, a radially inwardly arranged axial projection, with a radially outwardly directed resilient element and a first running surface, and a second bearing ring with a radially outwardly arranged axial projection with a radially inwardly directed resilient element with a second running surface and a single-part rolling body cage with rolling bodies which are distributed over the circumference and received by the rolling body cage, wherein the rolling body cage radially engages over the two resilient elements, wherein the rolling body cage is radially slotted, and wherein the roller bearing cage is tensioned radially outward or radially inwardly with the bearing rings.

2. Axial bearing arrangement according to claim 1, wherein the rolling bodies are radially aligned needles.

3. Axial bearing arrangement according to claim 1, wherein the rolling body cage has radially inwardly and radially outwardly an annular rim which is at least folded over once.

4. Method for manufacturing a axial bearing arrangement forming a structural unit, with a first bearing ring, a radially inwardly arranged axial projection with a radially outwardly directed resilient element and a first running surface and a second hearing ring with a radially outwardly arranged axial projection with a radially inwardly directed resilient element, with a second running surface and a single-piece rolling body cage for receiving rolling bodies that are distributed over the circumference and roll over the rolling surfaces, wherein the rolling body cage engages over the two resilient elements, wherein the rolling body cage is of radially slotted configuration and is placed in the bearing ring under radial pre-tensioning over one of the resilient elements of a bearing ring under elastic tensioning of the roller bearing cage, and the other bearing ring is pulled in the other direction over the rolling body cage, by overcoming its resilient element under radial re-tension of the rolling body cage.

* * * * *